US007676679B2

(12) United States Patent
Weis et al.

(10) Patent No.: US 7,676,679 B2
(45) Date of Patent: Mar. 9, 2010

(54) METHOD FOR SELF-SYNCHRONIZING TIME BETWEEN COMMUNICATING NETWORKED SYSTEMS USING TIMESTAMPS

(75) Inventors: Brian E. Weis, San Jose, CA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 1247 days.

(21) Appl. No.: 11/059,178

(22) Filed: Feb. 15, 2005

(65) Prior Publication Data

US 2006/0184797 A1 Aug. 17, 2006

(51) Int. Cl.
*H04L 9/00* (2006.01)
*H04L 9/32* (2006.01)
(52) U.S. Cl. .................. 713/178; 370/412; 370/469; 370/516; 713/150; 713/152; 713/170; 713/375; 713/400; 713/401; 713/500; 713/501; 713/502; 713/503
(58) Field of Classification Search .......... 370/412, 370/469, 516; 713/150, 152, 170, 400, 401, 713/500–503, 178, 375
See application file for complete search history.

(56) References Cited

U.S. PATENT DOCUMENTS

| 6,055,236 | A * | 4/2000 | Nessett et al. ............. 370/389 |
| 6,816,510 | B1 * | 11/2004 | Banerjee .................... 370/503 |
| 2002/0080779 | A1 | 6/2002 | LeBlanc |
| 2003/0007507 | A1 | 1/2003 | Rajwan et al. |
| 2003/0065917 | A1 | 4/2003 | Medvinsky et al. |
| 2004/0117623 | A1 * | 6/2004 | Kalogridis et al. .......... 713/165 |
| 2005/0083947 | A1 * | 4/2005 | Vaarala et al. ............ 370/395.51 |

OTHER PUBLICATIONS

Pister, K., "Tracking Vehicles with a UAV-delivered Sensor Network,", pp. 1-5, Mar. 12-14, 2001. http://eecs.berkeley.edu/~pister/29Palms0103/JasonUpdate/29palms.htm.*
International Searching Authority, "Notification of Transmittal of the International Search Report and the Written Opinion of the International Searching Authority, or the Declaration," PCT/US06/04262, dated Aug. 18, 2006, 8 pages.

(Continued)

*Primary Examiner*—Carl Colin
*Assistant Examiner*—Hee Song
(74) *Attorney, Agent, or Firm*—Hickman Palmermo Truong & Becker LLP

(57) ABSTRACT

Nodes in a network include a pseudo-timestamp in messages or packets, derived from local pseudo-time clocks. When a packet is received, a first time is determined representing when the packet was sent and a second time is determined representing when the packet was received. If the difference between the second time and the first time is greater than a predetermined amount, the packet is considered to be stale and is rejected, thereby deterring replay. Because each node maintains its own clock and time, to keep the clocks relatively synchronized, if a time associated with a timestamp of a received packet is later than a certain amount with respect to the time at the receiver, the receiver's clock is set ahead by an amount that expected to synchronize the receiver's and the sender's clocks. However, a receiver never sets its clock back, to deter attacks.

18 Claims, 6 Drawing Sheets

OTHER PUBLICATIONS

Claims, PCT/US06/04262, 5 pages.

Baugher, M. et al., "The Group Domain of Interpretation," RFC 3547, Dec. 2002, pp. 1-43.

Hardjono, T. et al., "The Multicast Group Security Architecture," RFC 3740, Mar. 2004, pp. 1-24.

Housley, R. et al., "Counter With CBC-MAC," http://csrc.nist.goc/CryptoToolkit/modes/proposedmodes/ccm.pdf, Jun. 2002.

Housley, R., "Using AES Counter Mode With IPsec ESP," draft-ietf-ipsec-ciph-aes-ctr-05.txt, Jul. 2003, pp. 1-17.

Kent, S. et al., "IP Encapsulating Security Payload (ESP)," RFC 2406, Nov. 1998, pp. 1-22.

Kent, S. et al., "Security Architecture for the Internet Protocol," RFC 2401, Nov. 1998, pp. 1-66.

Kent, S. et al., "IP Authentication Header," RFC 2402, Nov. 1998, pp. 1-22.

Madson, C. et al., "The Use of HMAC-SHA-1-96 Within ESP and AH," RFC 2404, Nov. 1998, pp. 1-7.

Madson, C. et al., "The ESP DES-CBC Cipher Algorithm With Explicit IV," RFC 2405, Nov. 1998, pp. 1-9.

McGrew, D. et al., "The Galois/Counter Mode of Operation (GCM)," http://csrc.nist.gov/CryptoToolkit/modes/proposedmodes/gcm-spec.pdf, Jan. 2004, pp. 1-41.

Viega, J. et al., "The Use of Galois/Counter Mode (GCM) in IPsec ESP," draft-ietf-ipsec-ciph-aes-gcm-00.txt, Apr. 2004, pp. 1-4.

http://www.iana.org/assignments/ipsec-registry, RCF 2409, last updated Jan. 1, 2004, pp. 1-4.

Cisco Systems, Inc. "Release Notes for the Cisco ICS 7750 for Cisco IOS Release 12.1(5)T2", Apr. 20, 2001, 24 pages, USA.

Cisco Systems, Inc. "Cisco Hoot and Holler over IP", Apr. 20, 2001, 32 pages, USA.

Fluhrer, Scott, "Antireplay Windows and Crypto Engines", message #3022, Friday, Apr. 9, 2004, 3 pages.

\* cited by examiner

METHOD FOR SELF-SYNCHRONIZING TIME BETWEEN COMMUNICATING NETWORKED SYSTEMS USING TIMESTAMPS

RELATED APPLICATIONS

This application is related to U.S. patent application Ser. No. 11/059,295, entitled, "CLOCK-BASED REPLY PROTECTION", of Brian E. Weis, et al., filed Feb. 15, 2005.

FIELD OF THE INVENTION

The present invention generally relates to network systems. The invention relates more specifically to network security.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Simple Network Time Protocol (SNTP), as described in Request for Comments (RFC) 2030 of the Internet Engineering Task Force, may be used for synchronizing clocks of network devices within a tolerable range of time. In SNTP and other prior methods, clock synchronization in a network depends upon a centralized server, or a coordinating set of servers from which systems can acquire the same master or "wall clock" time. The primary use of SNTP is to synchronize clocks using timestamps sent between servers and clients.

The Kerberos protocol of RFC 1510 uses timestamps to declare freshness of a Kerberos "ticket" that is included in a packet. However, the Kerberos timestamp is not used for synchronization between a sender and receiver.

The Intelligent Secure-Internet Server (IS-IS) routing protocol self-synchronizes Link State Packets (LSPs) comprising Protocol Data Units (PDUs) in a network using sequence numbers rather than timestamps. In IS-IS, the sequence number is associated with a particular LSP. Receiving an LSP with a higher sequence number from a neighbor indicates a more recent version of the LSP. Receiving an LSP with a lower sequence number from a neighbor causes a router to respond with its more recent version of the LSP.

Each of these approaches has disadvantages. For example, SNTP and other time synchronization mechanisms are difficult to use when groups contain a large number of members, and/or the group members are distributed over a wide area. Additionally, there are many networking scenarios where time services are not available, or are not supported by the devices performing authentication services.

In a data encryption protocol, such as Internet Protocol Security (EPSec) as described in RFC 2401 and other RFCs, often a receiver will accept a valid packet sent by a sender no more than once. Accepting a valid packet only once facilitates the detection and defeat of packets that are intentionally replayed by an adversary, as well the detection and discarding of packets that are accidentally duplicated in the network. If a receiver does not detect replayed packets, an attacker can use the replayed packet to cause the receiver to accept stale data as if it were fresh data. If the information in the packet is time sensitive, such a replay could be disastrous.

Furthermore, processing replayed packets wastes resources. Replayed packets can cause a cryptographic endpoint to unnecessarily expend CPU or memory resources, which an attacker may use for malicious purposes. For example, replayed packets can be used in Denial of Service (DoS) attacks as well as attacks seeking to fool the receiver.

Problems associated with mistaking stale data for fresh data, and the waste of resources that can be caused by replaying packets, are greatly magnified when packets are sent to a group. For example, an IP multicast group with 1000 receivers could be a particularly attractive target for an attacker, since the replay of a single stream of multicast packets will affect all 1000 receivers. If stale data is replayed, the entire group is fooled into accepting incorrect information thereby providing an advantage to the attacker. In the cases of a DoS attack, the entire group of receivers may be disabled due to resource exhaustion. Similarly, accidentally replayed multicast packets also provide incorrect data to all receivers or strain resources.

IPSec includes protocols for securing packet flows, and protocols for exchanging encryption keys used for setting up the secure flows. One IPSec protocol for securing packet flows is Encapsulating Security Payload (ESP), as described in RFC 2406, which encrypts packet flows. The IPSec Authentication Header (AH) of RFC 2402 provides authentication and message integrity guarantees for packet flows (but does not offer confidentiality).

The ESP and AH protocols provide replay protection to detect duplicate packets between two systems. However, the replay protection was designed for pair-wise communications between exactly two systems. When IPSec is used to protect multi-sender group traffic, replay protection becomes problematic. ESP and AH make provisions for replay protection through the use of sequence numbers. However, when IPSec is applied to group traffic with more than one sender, multiple senders may use the same sequence number. Consequently, IPSec sequence numbers are ineffective for preventing replay, because the uniqueness property of sequence numbers is violated, and therefore receiving two packets having the same sequence number does not indicate replay.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
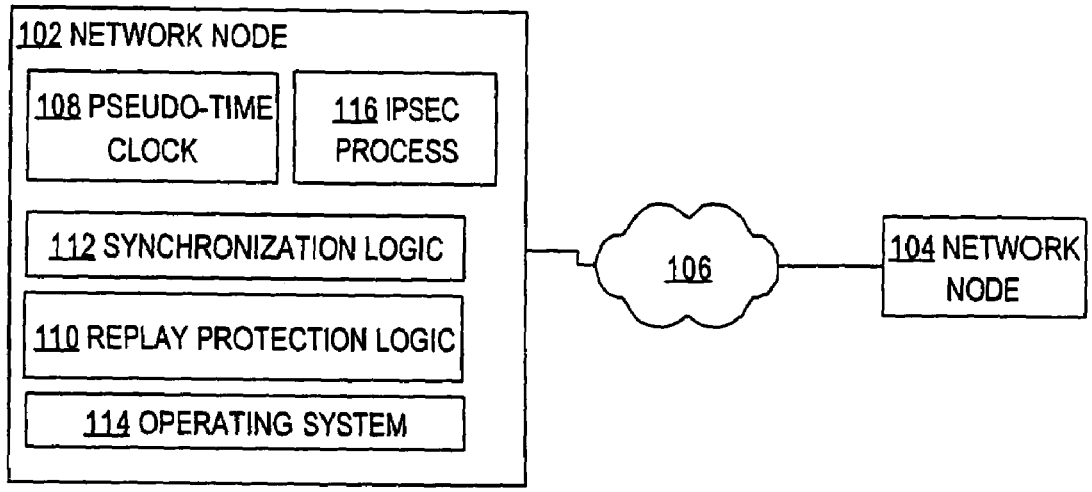
FIG. 1 is a block diagram of a communication system that can be used to implement an embodiment.

A method and apparatus for synchronizing a pseudo-time clock of a sender of a packet and a pseudo-time clock of a receiver of the packet are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Clock-Based Replay Protection
   3.1 Overview
      3.1.1 Pseudo-time
      3.1.2 Pseudo-timestamp
      3.1.3 Pseudo-timestamp Placement within an IPSec Transform
   3.2 Use with IPSec Authentication
      3.2.1 HMAC-SHA-1 Including a Pseudo-timestamp
      3.2.2 GCM Modified to Including a Pseudo-timestamp
      3.2.3 RSA-SIGS Including a Pseudo-timestamp
   3.3 Processing
      3.3.1 SA Creation
      3.3.2 Integrity Check Value Calculation
      3.3.3 Integrity Check Value Verification
      3.3.4 Impact on IPSec Hardware Acceleration Modules
   3.4 Group Synchronization
      3.4.1 Self-synchronization
      3.4.2 Synchronization Back Channel
      3.4.3 Synchronization by Key Management
   3.5 Key Management Interface
4.0 Implementation Mechanisms-Hardware Overview
5.0 Extensions and Alternatives Although headings are provided, information related to a particular heading, but not found in the section having that heading, may also be found elsewhere in the specification.

1.0 General Overview

The needs identified in the foregoing Background, and other needs and objects that will become apparent in the following description, are achieved in the present invention, which comprises, in one aspect, a method for synchronizing a pseudo-time clock of a sender of a packet and a pseudo-time clock of a receiver of the packet. Certain embodiments provide features that can be used independently of one another or with any combination of the other features. Although many features are motivated by the problems explained above, the embodiments need not address all or any of the problems discussed above.

In an embodiment, a timestamp referred to as a pseudo-timestamp is included in a packet. In an embodiment, when a packet is received a first time (which may be referred to as a pseudo-time) is determined representing when the packet was sent and a second time (which may also be referred to as a pseudo-time) is determined representing when the packet was received. If the difference between the second time and the first time is greater than a predetermined amount, the packet is considered to be stale and is not processed, thereby deterring the replay of a packet.

In an embodiment, each of a plurality of systems maintain their own clocks, and each clock maintains its own pseudo-time. To keep the pseudo-times of the different clock synchronized, if a pseudo-time associated with a pseudo-timestamp of a received packet is later than a certain amount with respect to the pseudo-time at the receiver, the receiver's clock is set ahead by an amount that is expected to synchronize the receiver's and the sender's clocks within a predetermined tolerance.

The pseudo-timestamp, replay protection method, and self-synchronization method described herein may be used individually and separately from one another, in conjunction with one another, or in any combination together with one another.

In this description, pseudo-time may be any set of values representing moments in time, and similarly a pseudo-timestamp is information from which one of the set of values can be determined. For specific embodiments, specific sets of time values may be substituted, such as those of a "wall clock" or other sets of values that are not those of a wall clock may be substituted. The term "wall clock" refers to a clock that provides a reference or master time.

2.0 Structural and Functional Overview

FIG. 1 is a block diagram of a communication system that can be used to implement an embodiment. Two or more communication nodes 102, 104 are communicatively coupled within or to a network 106. For implementing the techniques herein, each of the nodes 102, 104 comprises a pseudo-time clock 108, replay protection logic 110, and synchronization logic 112. Clock 108, logic 110, and logic 112 may be implemented using one or more computer programs, processes, other software elements, or any combination of software, firmware or hardware. An operating system 114 supervises input/output operations associated with the clock 108, logic 110 and logic 112. The OS 114 also may supervise or host a protocol application such as IPSec process 116.

Each of the nodes 102, 104 may be implemented as a data processing system that serves as either a network end station, such as a personal computer, workstation, etc., or an infrastructure element such as a router, switch, gateway, etc. For example, the general-purpose data processing hardware structure shown in FIG. 7 may be used for an implementation, with appropriate software elements for implementing clock 108, logic 110 and logic 112.

In this arrangement, protection for groups against replay based on clocks is provided for communications under protocols such as IPSec. One or more clocks are established that advance regularly. The clocks do not need to be synchronized to any particular other clock, although the clocks should be synchronized within an acceptable tolerance with each other. The clocks may run at a rate different than a wall clock. Therefore, the time tracked by the clocks is referred to as a pseudo-time. Thus, pseudo-time is distinct from system time or wall clock time. For example, the pseudo-time could begin at "0" or any other arbitrary value. The pseudo-time could be associated with a particular group encryption key, or with a set of group encryption keys. However, a wall clock or system clock may also be used for the clock when implementing the clock-based replay protection method.

Each system in the network individually keeps track of the pseudo-time by having its own clock or obtaining the pseudo-time from a central clock, for example. The term "system" broadly refers to any information-processing element that needs to reference a clock, including a network device, any other processing device, a software element, a process, or any combination thereof.

Additionally, a configurable window is set that is expected to be larger than twice the maximum latency between the pseudo-time at which a packet was sent and received, plus any other possible variance in the time for the packet to travel in the network. The window is used to determine whether a packet should be processed or dropped or whether the clocks need to be synchronized, for example. In an embodiment, the window is set to twice the expected maximum network latency between any two senders and receivers, plus the maximum of any other expected variance in the pseudo-time of the two systems.

In one particular embodiment, a sender of an IPSec packet includes a pseudo-time timestamp in the packet, which records a pseudo-time indicating when the packet was sent. Receivers of the packet compare the pseudo-timestamp to their respective current pseudo-times and then take responsive action based on one of at least three results.

1. The pseudo-timestamp in the packet is in the past with respect to the pseudo-time of the receiver, and the difference between the pseudo-time of the pseudo-timestamp and the pseudo-time of the receiver of the packet is smaller than the window. If the pseudo-time of the packet is in the past, and the difference between the pseudo-times is smaller than the window, the packet is considered to be a "fresh" packet and the packet is further processed.

2. The pseudo-timestamp in the packet is in the past with respect to the pseudo-time of the receiver, and the difference between the pseudo-time of the pseudo-timestamp and the pseudo-time of the receiver of the packet is larger than the window. If the pseudo-time is in the past, and the difference between the pseudo-times is larger than the window, the packet is considered stale, and the packet is immediately dropped.

3. The pseudo-timestamp of the packet is the same as the current pseudo-time at the receiver of the packet or the pseudo-time of the pseudo-timestamp is in the future with respect to the pseudo-time at the receiver. If the pseudo-times are the same or the pseudo-timestamp is in the future, then the sender and receiver clocks are not synchronized. The receiver may either accept or drop the packet, depending on local policy. Optionally, the receiver may also synchronize its clock.

The IPSec ESP and AH protocols do not include a field for the pseudo-timestamp. However, ESP and AH are defined as frameworks, to which specific IPSec security transforms may be added. Existing security transform documents for ESP and AH describe the semantics of a particular encryption or authentication algorithm. The clock-based replay protection method herein includes a method of adding a timestamp to an IPSec authentication transform.

IPSec authentication transforms specify the format of the Authentication Data field in AH and ESP. The approach herein uses an authentication transform that includes the pseudo-timestamp with an authentication value associated with the authentication transform. In an embodiment, a pseudo-timestamp is added to the authentication transform. Therefore, unlike a conventional IPSec transform, an authenticated pseudo-timestamp is included in an IPSec authentication transform, forming an authentication transform that provides clock-based replay protection, in addition to the authentication typically provided by the EPSec authentication transform. The clock-based replay protection results when a receiver determines that a packet was sent recently within configurable a window of time. Alternatively, an additional field is included in the AH or ESP packet format and stores the pseudo-timestamp.

Using the window as defined herein, communications between members of a large group may be protected from replaying a packet. The clock-based replay protection may be accomplished without storing per-sender information or storing a state of the each system in the group. Storing per-sender information or storing a state of the each system in the group is not scalable to arbitrarily large groups.

Further, a method is provided for systems to self-synchronize based on decentralized communications sent by peer systems. The self-synchronization method assumes the use of a protocol containing a timestamp, such as the pseudo-timestamp described above, which declares the time at which a packet was sent. Such a timestamp need not contain wall clock time, but can express a pseudo-time.

In an embodiment, the pseudo-timestamp is authenticated so that the pseudo-timestamp can be verified as accurate; however, authentication of the pseudo-timestamp is optional. Such authentication can be provided using the IPSec protocol with clock-based replay protection described above. However, other authentication protocols could be used instead.

In an embodiment, for self-synchronization, a timestamp is defined to be the value of a regularly advancing clock (using a pseudo-time, for example) at a particular point in time. The timestamp used by the self-synchronization method is also referred to as a pseudo-timestamp; however, the timestamps used by the self-synchronization method and the clock-based replay protection method do not need to be the same, and the two methods can each be used independent of one another.

In the self-synchronization method, each system maintains its own clock-based on pseudo-time. Each system synchronizes its clock with clocks of the other systems. When a packet is received, the receiver can compare the pseudo-time in the pseudo-timestamp of the packet to the pseudo-time of the receiver's clock. The result of the comparison is one of at least three possibilities.

1. The pseudo-timestamp in the packet is earlier than a predetermined amount compared to the current clock at the receiver.

2. The pseudo-timestamp in the packet is about the same as (within a predetermined amount of) the current clock at the receiver.

3. The pseudo-timestamp in the packet is ahead of the current clock at the receiver.

If the pseudo-timestamp is much earlier or is ahead of the clock, then the clocks of the sender and the receiver probably are not synchronized. If the pseudo-timestamp is significantly earlier than the clock of the receiver (e.g., by a predetermined amount, which may be the size of the window), then the sender's clock may be lagging. The remainder of this description primarily discusses the case in which the pseudo-timestamp is ahead of the clock of the receiver in relation to the self-synchronization process. However, in an embodiment, the self-synchronization process also is used when the sender's clock is far behind or greater than a predetermined amount compared to the receiver's clock.

In case (2.) above, the receiver does not need to take responsive action. In case (3.) above, when the pseudo-timestamp of a received packet is ahead of the receiver's pseudo-time clock by an amount greater than allowed, then the receiver re-synchronizes its clock to an estimated then-current time of the sender's clock, which is derived from the pseudo-timestamp in the data packet. Thus, the self-synchronization method herein uses pseudo-timestamps for self-synchronization, which advance according to a local clock.

The current setting of the local clock may take into account network latency or other expected variances in the pseudo-times of the clocks of the sender and receiver. For example, if the received packet's pseudo-timestamp is A, and the receiver's clock setting is B at the time of receiving the packet, and if the maximum allowed difference in the pseudo-times (e.g., the maximum latency in pseudo-time of travel from any sender to any receiver) is C, where A−B>C, then the receiver may advance its clock by |A−(B+C)|. In an embodiment, if the pseudo-timestamp is greater than a predetermined amount more than the allowed difference in pseudo-time, so that the pseudo-timestamp is too far in the future, the receiver may ignore the packet rather than synchronize its clock to the pseudo-timestamp in the packet.

In case (1.) above, a receiver induces the sender to re-synchronize the sender's pseudo-time clock using the following approach. In an embodiment, no system ever sets its clock to a pseudo-time that is earlier than its own current pseudo-time, because setting its clock to an earlier pseudo-time may allow an attacker to reset the clocks of receivers to a pseudo-time in the past. Resetting the pseudo-time to the past may cause problems with security applications that rely on pseudo-timestamps. For example, setting a clock to an earlier pseudo-time may circumvent the clock-based replay protection method described herein.

Nevertheless, using the approach herein a receiving system can force a sending system to re-synchronize to an accurate pseudo-time. Assume that network device S sends packets that are received by network device R, and R determines that the pseudo-time of the received packet is much earlier than R's pseudo-time clock, as in case (1.) given above. In response, R sends S a packet containing a pseudo-timestamp based on R's local clock. Device S determines that it has received a packet with a pseudo-timestamp far ahead of S's local clock; this is case (3.) given just above. Therefore, in response, S advances its clock to the estimated then-current pseudo-time of R's clock. Using this approach, a receiver of a packet with a timestamp that lags far behind its local clock gives the sender an opportunity to re-synchronize its clock, while preventing malicious attacks. Further, no sender or receiver ever becomes isolated with a clock that lags all others.

Alternatively, in case (1.), based on local policy, a receiver may silently ignore a much earlier pseudo-time in a packet, or may send a corrective pseudo-timestamp packet as described above only a limited number of times. These alternatives ensure that a malicious sender cannot carry out a DoS attack by sending a flood of packets that all have early pseudo-time values to induce the receiver to respond.

The method of self-synchronizing clocks herein is effective against man-in-the-middle attacks that attempt to change the time of a system to an earlier time. In an embodiment, the pseudo-timestamps are authenticated, so that they are protected from changes while in transit in the network. An attacker can delay the sending of the packet, but because no receiver sets its pseudo-time to an earlier pseudo-time, receiving a delayed packet cannot affect a clock of a system. Thus, the self-synchronization method herein is not significantly adversely affected by an attack from man-in-the-middle attackers.

Further, the self-synchronization method herein is effective against rogue senders. If a rogue sender sends packets having pseudo-timestamps in the past, a receiving system may ignore the rogue sender's packets or pseudo-timestamp values. If a rogue sender sends packets with pseudo-timestamps in the future, the rogue sender's packets may cause the receiver to self-synchronize to some time into the future. However, based on local policy, a receiver may drop packets or ignore pseudo-timestamp values that are greater than a predetermined amount in the future. In the absence of such a policy, pseudo-timestamps sent by a rogue sender that are greater than a predetermined amount may result in temporary packet loss. Nevertheless, once systems all self-synchronize to that pseudo-timestamp value, no further packet loss can occur, and therefore such an attack has no long-term effect.

Accordingly, the method herein enables devices to self-synchronize based on decentralized communications. Self-synchronization occurs when a system compares the pseudo-time of its local clock to a pseudo-timestamp value received from a sender, determines that the received pseudo-time value is ahead, and resets the system clock to the pseudo-timestamp received in the packet or to a value that is expected to synchronize the receiver's clock with the sender's clock within a predetermined tolerance. In an embodiment, the receiver's clock is never incremented more than a predetermined amount.

The self-synchronization method can be used in any network in which systems communicate pseudo-timestamp values and for which time synchronization is useful for the systems. Data packets containing pseudo-timestamps may be communicated using IP unicast, multicast, broadcast, or any other communication techniques. The self-synchronization method does not require group members to have contact with a centralized time synchronization service. However, systems that implement the self-synchronization method herein may also use a centralized time synchronization service.

Although the clock-based replay protection method and the self-synchronization method herein may be used for communications between servers and clients, clients need not synchronize with dedicated time-protocol servers, because the synchronization process occurs during communications between network peers that are already in direct communication.

3.0 Clock-Based Replay Protection for IPSEC

Replay protection for IPSec is provided using a clock-based approach. The clock-based replay protection approach herein provides an effective alternative to sequence number-based replay protection provided by as part of IPSec. Clock-based replay protection is appropriate, for example, when sequence numbers are not practical, such as when a single IPSec Security Association (SA) protects traffic among large groups. An example of group traffic is an IP multicast group in which many members may send data. In an embodiment, when clock-based replay protection is used for an SA, sequence number-based replay protection is disabled.

3.1 Overview

Clock-based replay protection uses a constant number of state-independent senders using a particular IPSec SA. Many emerging applications use a single ESP SA to protect packets sent between a group of systems, such as an IP multicast group, when the application needs to be state independent. In this description, a sender is a system that prepares a packet for sending and sends the packet. The sender may encrypt some or all of the contents of the packet. A receiver is a system that receives and processes information in the packet. The receiver may perform decryption. Clock-based replay protection relies on an external system, such as a group key management system, to initially distribute pseudo-timestamp values to systems that are members of a group. RFC 3547 describes an example group key management system. Key management considerations are discussed further in a later section.

In clock-based replay protection, implementing strong replay protection is optional, and loose protection is provided when that option is not selected or implemented. If implemented or selected, strong replay protection is applied to an SA for the entire duration of that SA.

3.1.1 Pseudo-Time

Clock-based replay protection uses a clock that advances regularly, but the clock is not necessarily synchronized to any particular wall clock. The clock may run at a rate slightly different than a wall clock. The clock may be based on a hardware system clock of the system. The time tracked by the clock is "pseudo-time." The duration of one interval of the clock is a "tick." Each IPSec SA that uses clock-based replay protection is associated with a particular clock for tracking its pseudo-time.

3.1.2 Pseudo-Timestamp

Each clock-based replay protection ESP packet includes a pseudo-timestamp containing the pseudo-time at which the sender created the packet. Receivers use the pseudo-timestamp to determine if the packet is a replayed packet by using specified processing rules. The size of the pseudo-timestamp may vary in an implementation. Issues relating to the size of the pseudo-timestamp are the EPSec SA lifetime and the length of time represented by a tick. Specifically, in one embodiment, (1) the pseudo-timestamp must be large enough to represent all time that elapses during the entire lifetime of the IPSec SA, and (2) the time difference between each unique pseudo-timestamp value (i.e., the size of a tick) must be capable of representing the least duration of time during which packets will be sent with the same pseudo-timestamp. In an embodiment, the length of the pseudo-timestamp value in an IPSec packet can vary, but must be a function of the difference duration of time between ticks and the lifetime of the IPSec SA.

Table 1 shows possible sizes of the pseudo-timestamp depending upon the length of the tick (in wall clock time):

TABLE 1

SIZE OF PSEUDO-TIMESTAMP

| Duration of time between ticks (secs) | Pseudo-timestamp length (bits) | Maximum SA lifetime (secs) | Maximum SA lifetime (hrs) | Maximum SA lifetime (days) |
| --- | --- | --- | --- | --- |
| 1 | 16 | 65,536 | 18 | 0.8 |
| 1 | 24 | 16,777,216 | 4,660 | 194.2 |
| 0.1 | 16 | 6,554 | 2 | 0.1 |
| 0.1 | 24 | 1,677,722 | 466 | 19.4 |
| 0.1 | 32 | 429,496,730 | 119,305 | 4,971.0 |
| 0.01 | 24 | 167,772 | 47 | 1.9 |
| 0.01 | 32 | 42,949,673 | 11,930 | 497.1 |
| 0.001 | 24 | 16,777 | 5 | 0.2 |
| 0.001 | 32 | 4,294,967 | 1,193 | 49.7 |
| 0.0001 | 24 | 1,678 | 0 | 0.0 |
| 0.0001 | 32 | 429,497 | 119 | 5.0 |
| 0.00001 | 32 | 42,950 | 12 | 0.5 |
| 0.000001 | 32 | 4,295 | 1 | 0.0 |

Table 1 is based on the formula: (duration between ticks) *2^(number of bits in pseudo-timestamp)$\geq$(IPSec SA life time). Conversely, dividing both sides by (duration between ticks) and taking the log to the base 2 of both sides one obtains the relation: (number of bits in pseudo-timestamp)$\geq LOG_2\{$ (IPSec SA life time)/(duration between ticks)$\}$ Based on the table in Table 1, a field size for the pseudo-timestamp of 32 bits is appropriate for a duration between tickets of less than a millisecond.

Although the formulas described for Table 1 assume that the wall clock time between ticks is always the same, the formulas of Table 1 are appropriate even when such an assumption does not hold. When the duration between ticks differs periodically, the average time between ticks plus a tolerance that accounts for the variation is used for the "duration of time". However, in many cases the tolerance for the duration of time is a relatively small number and can be ignored.

3.1.3 Pseudo-Timestamp Placement within an IPSEC Transform

In various embodiments, a pseudo-timestamp is incorporated in various parts of an EPSec transform. In one embodiment, a new field is added to the ESP or AH and carries the pseudo-timestamp value. In another embodiment, an existing field is replaced or overloaded to carry the pseudo-timestamp value. For example, some IPSec transforms do not specify a particular construction for the IV field. Examples include the Advanced Encryption Standard (AES) Counter Mode transform (AES-CTR), and the AES Galois/Counter Mode (GCM) transform (AES-GCM). The IV field of such transforms can carry a pseudo-timestamp value, in one embodiment.

Further, the Authentication Data field can carry a pseudo-timestamp value. More generally, an algorithm for the pseudo-timestamp could be defined as part of an IPSec authentication algorithm. The format of the Authentication Data field depends upon the particular IPSec authentication transform that is implemented. Therefore, in this approach, a new IPSec authentication transforms are created that are additive to an existing authentication transform. For example, in an implementation of an authentication transform, the computer program code that recognizes authentication failures also includes code that causes conditions indicating a replayed packet to constitute an authentication failure. Using this approach, clock-based replay protection is seamlessly integrated into the IPSec standards.

3.2 Use with IPSEC Authentication

Clock-based replay protection may be used with several IPSec authentication approaches. For example, clock-based replay protection may be implemented in an authentication algorithm such as SHA-1, or a combined encryption/authentication algorithm such as GCM or CCM. In such an approach, additional data and steps are introduced during the ESP Integrity Check Value (ICV) processing. When a replay is detected, the combined algorithm indicates an authentication failure (e.g., as described in Section 3.4.4 of RFC 2406).

Figure 2:
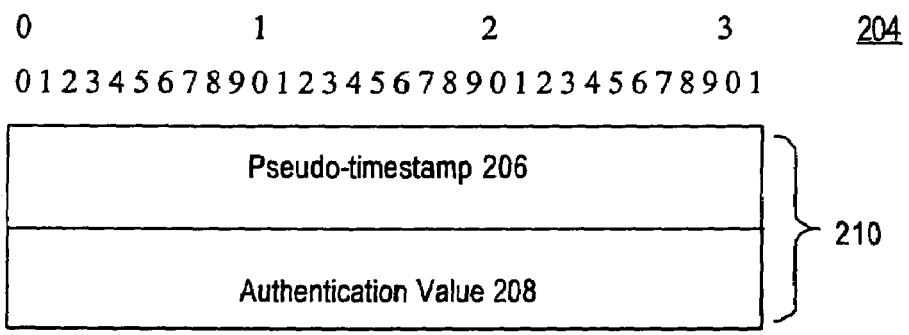
FIG. 2 is a block diagram of an embodiment of a format of a packet authentication header that includes a pseudo-timestamp.

FIG. 2 is an embodiment of a format of a packet authentication header that includes a pseudo-timestamp. Bit labels 204 indicate bit positions of data in a packet that conforms to the format of FIG. 2. Pseudo-timestamp field 206 holds a pseudo-timestamp. Authentication value 208 authenticates a packet conforming to the format, and is determined by any of a number of transforms. In an embodiment, an authentication field 210 may include both a portion for pseudo-timestamp 206 and a portion for authentication value 208. Thus, the pseudo-timestamp 206 may be concatenated to the authentication value 208, as illustrated in FIG. 2, or may be included or encoded within the authentication field 210 in other ways.

3.2.1 HMAC-SHA-1 Including a Pseudo-Timestamp

HMAC-SHA-1 (RFC2404) is a widely used IPSec authentication method and is supported in many existing IPSec hardware acceleration devices. One method of adding clock-based replay protection to HMAC-SHA-1 is to define the authentication field such that authentication value 208 (FIG.

2) is determined by HMAC-SHA-1. The pseudo-timestamp is added to the authentication transform described in RFC 2404, thereby creating a new transform.

3.2.2 GCM Including a Pseudo-Timestamp

AES-GCM defines both ESP encryption and authentication. AES-GCM authentication includes an authentication tag in the ESP authentication field. One method of using clock-based replay protection with GCM is to implement GCM so that the GCM authentication value is used for authentication value 208. One output of GCM is an authentication tag, and therefore the pseudo timestamp can be carried in the same manner as SHA1, co-located with the authentication tag.

3.2.3 RSASIGS Including a Pseudo-Timestamp

In one embodiment, the approaches herein are used in conjunction with the RSA-based digital signature approach known as RSASigs (as described in the document IETF Internet-Draft draft-ietf-msec-ipsec-signatures-03.txt). In RSASigs, RSA signatures are used as an IPSec authentication method to achieve source origin authentication in large groups. Replay protection is a particular issue with this method, because the cost of performing RSA verification is significantly larger than for HMAC. Therefore, adding replay protection to the RSA signatures is desirable. One method of adding clock-based replay protection to the RSA signatures is to define the authentication field such that the RSA signatures are used for authentication value 208.

3.3 Processing

Additional data processing steps may be performed in some embodiments of clock-based replay protection.

3.3.1 SA Creation

Providing an indication during SA creation that clock-based replay protection is enabled is desirable for management of an encryption key. In an embodiment, if clock-based replay protection is defined as part of an authentication method, then IPSec SA Authentication Algorithm values are allocated as provided in the IPSec Registry approach, described in the document "ipsec-registry" in the folder "assignments" of the domain "iana.org" on the World Wide Web. When an SA with clock-based replay protection is enabled, the SA is populated with the pseudo-time for the group, and the key management system may be used to initially distribute the pseudo-time to the members of the group.

3.3.2 Integrity Check Value Calculation

Figure 3:
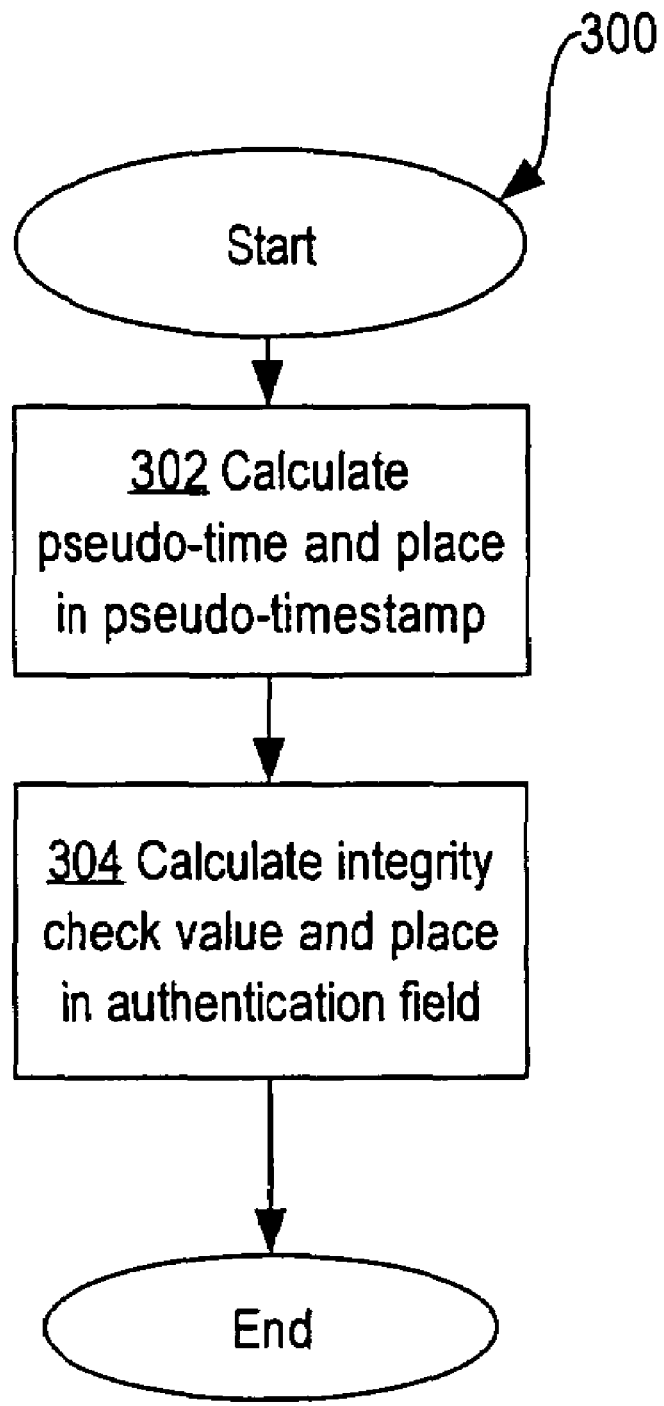
FIG. 3 is a block diagram of a flowchart of an example of an algorithm performed by the sender, which may be performed during the Integrity Check Value (ICV) calculation phase of ESP processing.

FIG. 3 is a flow diagram of a process for checking flowchart 300 of an algorithm performed by the sender, which may be performed during the Integrity Check Value (ICV) calculation phase of ESP processing, for example.

In step 302, the current pseudo-timestamp is calculated. The calculation may be based on values stored in the SA, and are placed in the pseudo-timestamp portion of the authentication field, for example.

In step 304, an integrity check value is determined. Step 304 may involve calculating an ICV as described in RFC 2406, Section 3.3.4, and based on the chosen authentication method. The pseudo-timestamp 206 may be included as part of the input for the ICV calculation by for example concatenating the pseudo-timestamp to the other input of the ICV calculation.

3.3.3 Integrity Check Value Verification

Figure 4:
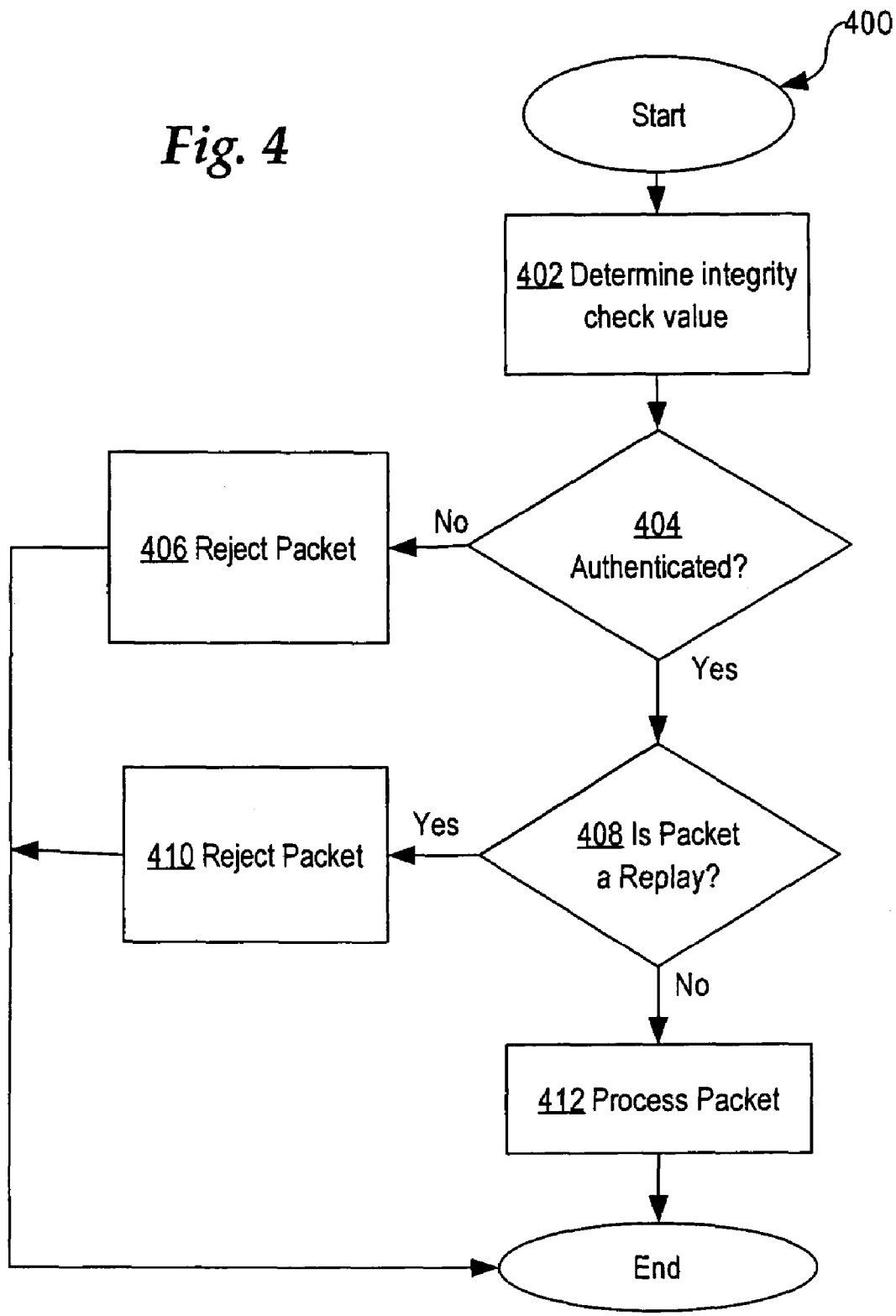
FIG. 4 is a block diagram of a flowchart of an example of an algorithm that is performed on the sender during the ICV verification phase of ESP processing.

FIG. 4 is a flowchart 400 of an example process that is performed by a sender during the ICV verification phase of ESP processing. In step 402, the ICV is calculated over the field described in RFC 2406, Section 3.4.4 for the chosen authentication method. Additionally, the pseudo-time of the pseudo-timestamp, and at the receiver, are determined. For example, the pseudo-time may be read or otherwise determined from the pseudo-timestamp. To obtain the pseudo-time of the receiver's clock, the clock may generate a pseudo-time value upon detecting that a packet is received or may read a pseudo-time value generated just prior to or just after receiving the packet. The pseudo-time associated with the receiver's clock and the pseudo-time of the pseudo-timestamp are compared. In step 404, a determination is made whether the authentication check failed or was successful. For example, depending on the authentication method used, the ICV calculated at the receiver and the ICV in the authentication field may be compared to see if they are identical. In step 406, if the authentication failed, the packet is rejected (e.g., not processed or dropped). In step 408, the pseudo-time in the pseudo-timestamp is checked to verify that the packet is not a replayed packet using the clock-based replay check. If the clock-based replay check indicates that the packet was replayed, then in step 410 the packet is rejected.

Otherwise, if the clock-based replay check does not indicate the packet was replayed, then in step 412 the packet is processed. In alternative embodiments, other steps may be included, the above steps may be performed in a different order, and/or some of the above steps may be left out or replaced. For example, the determination of the pseudo-times and the ICVs may be performed at anytime prior to the time at which they are needed. The authentication and the determination as to whether the packet is expected to be a replay may be performed simultaneously or in any order with respect to one another.

Figure 5:
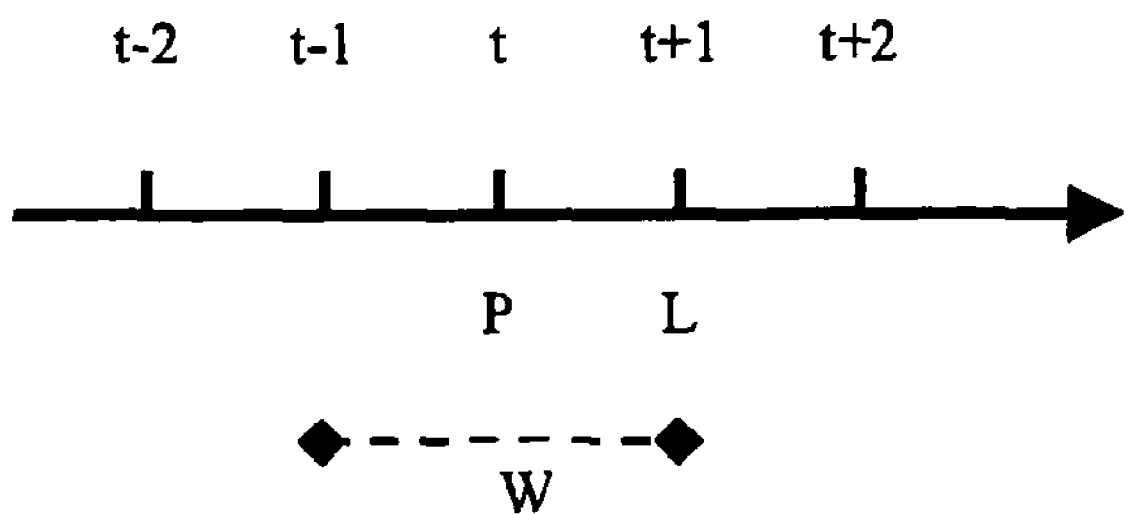
FIG. 5 is a pseudo-time line illustrating an example of the clock-based replay check of a step the algorithm of FIG. 4.

FIG. 5 illustrates an example clock-based replay check as performed at step 408 of FIG. 4. In FIG. 5, the notations $t-2$, $t-1$, $t$, $t+1$, and $t+2$ represent distinct pseudo-time values on a pseudo-time line. Also, P denotes the value of the pseudo-timestamp of a received packet, L denote the local time at the receiver of the packet, and W the length of time during which packets will be accepted. If $P<L-W$, then the packet is rejected as a replayed packet. Otherwise, if $P \geq L-W$, the verification is deemed successful. However, in an embodiment, if $P>T+L-W$, where T is a predetermined duration of pseudo-time, the packet is also dropped, because it is expected to be unlikely that a packet would have a pseudo-timestamp that is greater than $T+L-W$ as a result of a senders clock drifting.

3.3.4 Impact on IPSEC Hardware Acceleration Modules

Synchronization of sender and receiver clocks reduces the likelihood of an unnecessary packet loss. The following sections describe methods by which the group pseudo-time can be kept synchronized.

3.4 Group Synchronization

A group of pseudo-time clocks, in which each clock is associated with one of a group of nodes, may be synchronized. Each node may be an individual device or a system of devices.

3.4.1 Self-Synchronization

A method of self-synchronization is used in which a receiver may adjust its clock-based on the pseudo-time used by the sender. In other words, if the receiver recognizes that the pseudo-time of the sender is ahead of a predetermined difference between the pseudo-time of the receiver's clock and the pseudo-time of the pseudo-timestamp (e.g., if the pseudo-timestamp is ahead of the pseudo-time of the receiver), the receiver recognizes that the sender's clock is in advance of its own. For example, in FIG. 5, the receiver recognizes that the sender's clock is advanced with respect to the receiver when the pseudo-time is greater than $t+1$.

In an embodiment, the window used for determining if the received packet was replayed is the same as the allowed time difference between the pseudo-times for the purposes of determining whether to synchronize clocks. In an alternative embodiment, the window used for determining if the received packet was replayed is different than the allowed time difference between the pseudo-times for the purposes of determining whether to synchronize clocks.

If an IPSec packet containing a pseudo-timestamp is received and the local pseudo-time value precedes the value of the pseudo-time field in the packet, then it is expected that the local clock of the receiver is lagging the correct pseudo-time. In response, the receiver adjusts its local pseudo-time by setting its local pseudo-time to a value derived from the pseudo-timestamp of the packet. In an embodiment, the receiver does not set its pseudo-time backwards, because setting the receiver's clock backwards voids future attempts at clock-based replay protection. The amount of time that a receiver adjusts its clock depends on the implementation. An implementation may choose to set the receiver's time anywhere in the clock-based replay protection window, for example. In an embodiment, the receiver never advances its time more than a predetermined amount.

In an embodiment, if the pseudo-timestamp indicates that the receiver's clock is expected to be lagging the sender's clock by more than a predetermined amount, no correction is made or only a much smaller correction is made, as a precaution in case the sender is maliciously attempting to disrupt the synchronization of the clocks. In this manner, a malicious sender can only advance the pseudo-time of the group in increments that are small enough so that any disruption is not significant.

3.4.2 Synchronization Back Channel

In a group with multiple senders, self-synchronization may affect senders who are not also receivers from other group members. That is, senders that are not receivers will have no opportunity to compare their clock to other group members. In this case, if the sender's clock lags all clocks of all receivers of a group by more than a predetermined amount, then other group members will continually drop the sender's packets as if they were replayed packets.

When traffic matching the group SA is flowing in a unidirectional manner between two group members, there may be a value associated with a pseudo-timestamp in a packet received by the receiver informing the receiver that the sender appears to be unsynchronized with the group. If an ESP packet containing a pseudo-timestamp is received, and the local pseudo-time value is greater than an allowed amount than the value of the pseudo-time field in the packet (e.g., by a factor larger than the clock-based replay protection window or another predetermined amount), then the local clock of the sender may be lagging the correct pseudo-time.

If a receiver does not have any packet to send back to the sender, the receiver may send a packet with a zero-length payload or no payload to the sender. The sending of the packet to the sender has the effect of triggering the sender of the original packet to advance its clock, which is lagging. A packet containing a lagging pseudo-time might indicate that its sender has a lagging clock, but it might also merely be a replayed packet. In an embodiment, a device implementing the clock-based replay protection ESP does not send back packets each time that it observes apparently lagging clocks. Instead, the receiver may selectively respond in a manner that does not consume excessive bandwidth. The receiver may use any heuristics available to it to determine whether a reply to a lagging clock is appropriate. One such method is to choose randomly whether or not to reply, with a probability chosen to limit the rate of replies to an acceptable value. This method bounds the expected packet loss due to pseudo-time de-synchronization, while providing a simple and stateless heuristic that also bounds the bandwidth consumed by reply messages used for clock synchronization. Additionally, in an embodiment, if the pseudo-timestamp indicates that the sender's clock is lagging by more than a predetermined limit, no reply is sent.

Figure 6:
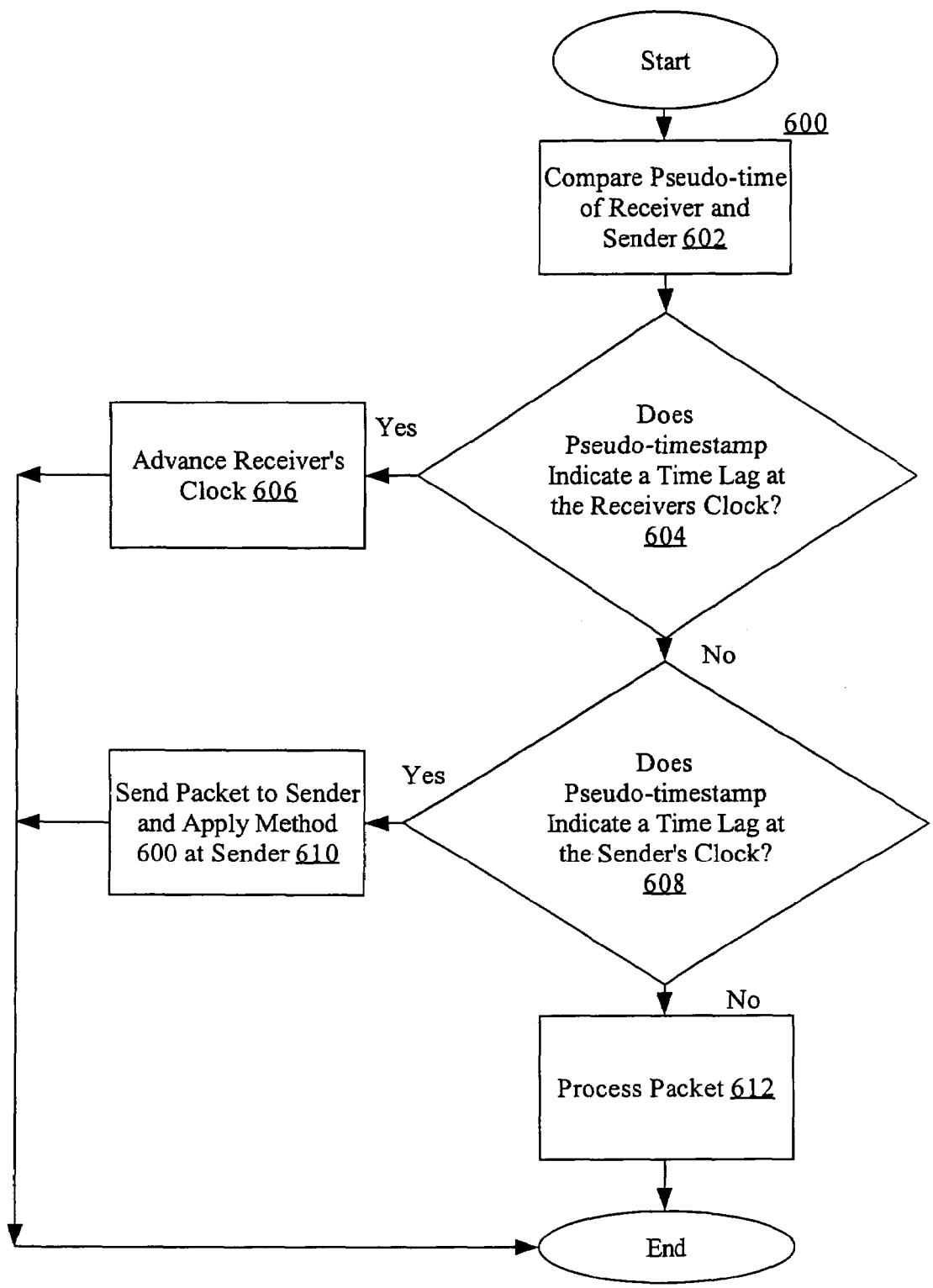
FIG. 6 is a block diagram of a flowchart of an example of an algorithm that is performed by the receiver for synchronizing the clocks of the receiver and the sender.

FIG. 6 is a flow diagram of an example process that is performed by the receiver for synchronizing the clocks of the receiver and the sender. In step 602, the receiver determines the pseudo-time of the sender's clock, based on information such as a pseudo-timestamp in a packet sent by the sender. For example, the pseudo-time may be read or otherwise determined from the pseudo-timestamp. The receiver also determines the pseudo-time at which the packet was received according to the clock associated with the receiver. For example, the clock may generate a pseudo-time value upon detecting that a packet is received or may read a pseudo-time value generated just prior to or just after receiving the packet. The pseudo-time associated with the receiver's clock and the pseudo-time of the pseudo-timestamp are compared. In step 604, a determination is made whether the pseudo-time derived from the packet is more than a predetermined amount greater than a first predetermined pseudo-time based on the pseudo-time at the receiver. If the pseudo-time derived from the packet is more than the predetermined amount greater than the first predetermined pseudo-time, the method precedes to step 606, because the receiver's clock is assumed to be lagging behind the sender's clock. In step 606, the clock of the receiver is advanced so that it is expected to be synchronized within a given tolerance with the clock of the sender. The method may end at that point. Alternatively, in one embodiment, after advancing the clock in step 606, the method optionally proceeds to step 612. In this alternative, the packet is processed normally, because by adjusting the receiver's clock based on the packet, the receiver is essentially accepting the packet as legitimate. If the pseudo-time derived from the packet is less than the predetermined amount, the method proceeds to step 608. In step 608, the pseudo-time derived from the pseudo-timestamp is checked to see if it is prior to a second predetermined pseudo-time that is also based on the clock of the receiver, but is earlier than the first predetermined pseudo-time. If the pseudo-time derived from the pseudo-timestamp is prior to the second predetermined pseudo-time, the method proceeds to step 610. In step 610, the receiver sends a packet to the sender, and method 600 is repeated except at the sender to check if the sender's clock lags behind the receiver's clock. Otherwise, if the pseudo-time derived from the pseudo-timestamp is prior to the second predetermined pseudo-time, then method 600 ends at step 612.

In alternative embodiments other steps may be included, the above steps may be performed in a different order, and/or some of the above steps may be left out or replaced. For example, the determination of each of the pseudo-times may be performed at any time prior to the time at which each is needed. The steps for determining of the pseudo-times performed for method 400 may be as the steps for determining the pseudo-times in method 600. The methods 400 and 600 may share the same steps for determining the pseudo-times and the pseudo-times only need to be determined once for both methods.

3.4.3 Synchronization by Key Management

When automated group key management is available, it could be used to periodically resynchronize the group. For example, the GDOI protocol includes a Rekey message that is periodically sent to group members to update the group state. The Rekey message could be modified to resend the "current" pseudo-time for each SA to each member of the group.

3.5 Key Management Interface

In an embodiment, the key management provides to each member of a security group the following information as a part of each SA for which clock-based replay protection is to be used: (1) an attribute indicating that the clock-based replay protection is enabled; (2) the current pseudo-time for the group; and (3) optionally, a value for the maximum allowed difference in pseudo-times between a pseudo-timestamp and a receiver's clock. The value for the maximum allowed pseudo-time difference may be the same as the clock-based replay protection window size, if the transform supports variable window sizes.

4.0 Hardware Overview

Figure 7:
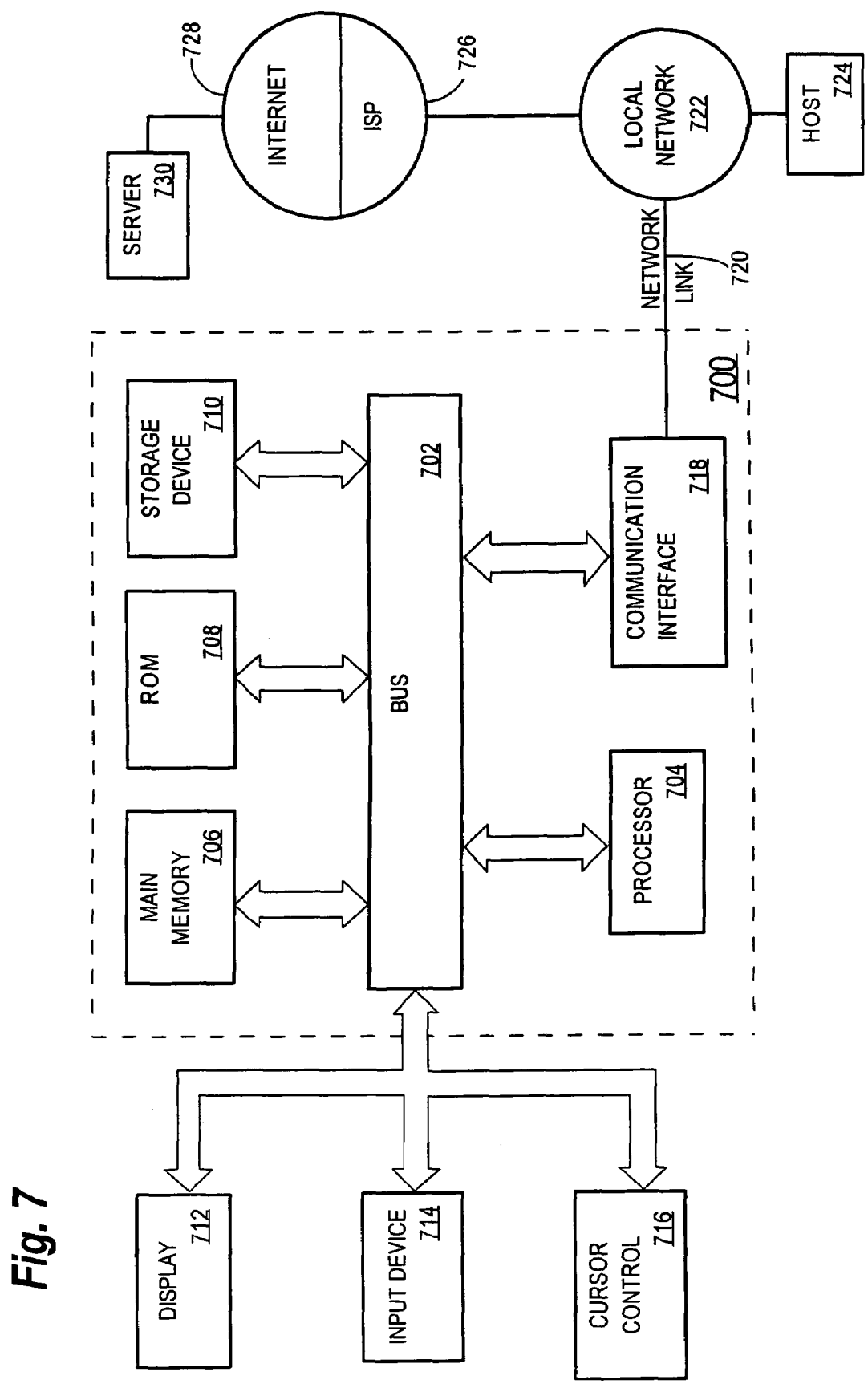
FIG. 7 is a block diagram that illustrates a computer system upon which an embodiment may be implemented.

FIG. 7 is a block diagram that illustrates a computer system 700, which is just one example of a machine upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for clock-based replay protection. According to one embodiment of the invention, clock-based replay protection is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read. Computer-readable medium is just one example of a machine-readable medium that may be used in a machine that implements an embodiment of the invention.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for clock-based replay protection as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method of synchronizing a pseudo-time clock of a sender of a packet and a pseudo-time clock of a receiver of the packet, the method comprising:
   receiving, at the receiver, the packet sent from the sender;
   determining a first pseudo-time associated with the pseudo-time clock of the receiver;
   determining a second pseudo-time associated with the pseudo-time clock of the sender based on information in the packet;
   determining whether the pseudo-time clock of the receiver and the pseudo-time clock of the sender are unsynchronized by more than an allowed amount, based on comparing the first pseudo-time and the second pseudo-time;
   in response to determining that the pseudo-time clock of the sender is lagging the pseudo-time clock of the receiver by more than an allowed amount, sending, from the receiver to the sender, a packet comprising information from which a new pseudo-time can be determined that is based on the pseudo-time clock of the receiver,
   wherein the method is performed by the receiver, and wherein the receiver comprises a processor.

2. A machine-implemented method as in claim 1, further comprising advancing the pseudo-time clock of the receiver in response to determining that the pseudo-time clock of the receiver is lagging the pseudo-time clock of the sender by more than the allowed amount.

3. A machine-implemented method as in claim 1, wherein the determining step comprises determining whether a difference between the first pseudo-time and the second pseudo-time is less than a predetermined amount.

4. A machine-implemented method as in claim 1, further comprising receiving at the receiver a message having information about an encryption key and a pseudo-time associated with an IPSec Security Association.

5. A machine-implemented method as in claim 1 wherein the first pseudo-time is determined from a pseudo-timestamp in a field of the packet.

6. A machine-implemented method as in claim 1 wherein the first pseudo-time is determined from a pseudo-timestamp in a portion of a field of the packet that contains a number of bits that is greater than a value determined based on an expected lifetime of a security association and a duration of time for a pseudo-time clock to generate two consecutive pseudo-times.

7. A machine-implemented method according to claim 1, wherein the pseudo-time clock of the receiver is not set backwards in pseudo-time even if the receiver's pseudo-time clock is determined to have a pseudo-time that is expected to be advanced with respect to the pseudo-time clock of the sender.

8. A machine-implemented method as in claim 1, wherein the pseudo-time clock of the receiver advanced only according to a specified small amount.

9. A machine-implemented method according to claim 1, wherein the pseudo-time clock of the receiver is not set backwards in pseudo-time even if the receiver's pseudo-time clock is determined to have a pseudo-time that is expected to be advanced with respect to the pseudo-time clock of the sender.

10. A machine-implemented method of synchronizing a pseudo-time clock of a sender of a packet and a pseudo-time clock of a receiver of the packet, the method comprising:
    a sender including a first pseudo-timestamp in a first packet, wherein the first pseudo-timestamp includes information from which a first pseudo-time can be determined, and wherein the first pseudo-time is based on a first pseudo-time clock associated with the sender;
    the sender sending the first packet to a receiver;
    in reply, the sender receiving a second packet from the receiver;
    the second packet having a second pseudo-timestamp that includes information from which a second pseudo-time can be determined, wherein the second pseudo-time is based on a second pseudo-time clock, wherein the second pseudo-time clock is associated with the receiver;
    the sender determining that the first pseudo-time clock is expected to be lagging the second pseudo-time clock based on the second pseudo-timestamp by more than a predetermined amount; and
    the sender advancing the second pseudo-time clock to a pseudo-time that is expected to be synchronized with the first pseudo-time clock within a predetermined tolerance,
    wherein the method is performed by the sender, and wherein the sender comprises a processor.

11. A machine-implemented method according to claim 10, wherein the second packet has an empty payload.

12. An apparatus for synchronizing a pseudo-time clock of a sender of a packet and a pseudo-time clock of a receiver of the packet, the method comprising:
    one or more processors;
    means for receiving, at the receiver, the packet sent from the sender;
    means for determining a first pseudo-time associated with the pseudo-time clock of the receiver;
    means for determining a second pseudo-time associated with the pseudo-time clock of the sender based on information in the packet;
    means for determining whether the pseudo-time clock of the receiver and the pseudo-time clock of the sender are unsynchronized by more than an allowed amount, based on comparing the first pseudo-time and the second pseudo-time;
    means for sending, from the receiver to the sender, a packet comprising information from which a new pseudo-time can be determined that is based on the pseudo-time clock of the receiver, in response to determining that the pseudo-time clock of the sender is lagging the pseudo-time clock of the receiver by more than an allowed amount.

13. An apparatus as in claim 12, further comprising means for advancing the pseudo-time clock of the receiver in response to determining that the pseudo-time clock of the receiver is lagging the pseudo-time clock of the sender by more than the allowed amount.

14. An apparatus as in claim 12, wherein the determining step comprises determining whether a difference between the first pseudo-time and the second pseudo-time is less than a predetermined amount.

15. An apparatus as in claim 12, further comprising means for receiving at the receiver a message having information about an encryption key and a pseudo-time associated with an IPSec Security Association.

16. An apparatus as in claim 12, wherein the first pseudo-time is determined from a pseudo-timestamp in a field of the packet.

17. An apparatus as in claim 12, wherein the first pseudo-time is determined from a pseudo-timestamp in a portion of a field of the packet that contains a number of bits that is greater than a value determined based on an expected lifetime of a security association and a duration of time for a pseudo-time clock to generate two consecutive pseudo-times.

18. An apparatus as in claim 12, wherein the pseudo-time clock of the receiver advanced only according to a specified small amount.

\* \* \* \* \*